United States Patent [19]

Joshi

[11] 4,017,573

[45] Apr. 12, 1977

[54] PROCESS FOR MAKING VARIEGATED SOAP

[75] Inventor: Hargovind Himatlal Joshi, Piscataway, N.J.

[73] Assignee: Colgate-Palmolive Company, New York, N.Y.

[22] Filed: June 4, 1975

[21] Appl. No.: 583,802

[52] U.S. Cl. .................................. 264/75; 252/90; 252/132; 252/134; 252/DIG. 16; 264/102; 264/148; 264/245; 264/320

[51] Int. Cl.² ................... B29F 3/12; C11D 13/08; C11D 13/18

[58] Field of Search ..... 252/90, 134, 132, DIG. 16; 264/75, 245, 73, 239–241, 148; 425/131.1

[56] References Cited

UNITED STATES PATENTS

| | | | |
|---|---|---|---|
| 3,485,905 | 12/1969 | Compa et al. | 252/134 |
| 3,598,746 | 8/1971 | Kaniecki et al. | 252/DIG. 16 |
| 3,676,538 | 7/1972 | Patterson | 264/75 |
| 3,814,698 | 6/1974 | Ferrara et al. | 252/DIG. 16 |

OTHER PUBLICATIONS

Martin, Modern Soap and Detergent Industry vol. II Technical Press Ltd. 1951 p. 19.
Rose – The Cond. Chem. Dict. vol. 7–1966 Reinhold Publ. Co. p. 704.

*Primary Examiner*—Harris A. Pitlick
*Attorney, Agent, or Firm*—Kenneth A. Koch; Herbert S. Sylvester; M. M. Grill

[57] ABSTRACT

A process for making multicolored soap bars wherein a coloring agent is dispersed in a liquid oil vehicle and introduced into a base soap material before the base soap material is extruded in the form of a continuous log which is subsequently cut and pressed to form a multicolored soap bar.

6 Claims, No Drawings

PROCESS FOR MAKING VARIEGATED SOAP

BACKGROUND OF THE INVENTION

This invention relates to a process for making multicolored soap bars and particularly to a process enabling the production of an improved variegated, striated or marbleized soap bar wherein the color striations are sharper and more distinct relative to soap bars produced by prior art processes.

Various processes are know wherein milled soap of a base color such as white is introduced into a more or less conventional double barrel plodder along with a suitable coloring agent whereby the extruded column exhibits color striations, and the column is subdivided and pressed to form bars of variegated soap. For example, see Compa et al U.S. Pat. No. 3,485,905 which teaches adding the coloring agent in the form of an aqueous dye solution to the vacuum chamber between the upper and lower plodder barrels. Other apparatus and processes for producing marbleized or striated soap are disclosed, for example, in Matthaei U.S. Pat. Nos. 3,832,431; 3,769,225 and 3,673,294; Meyer et al U.S. Pat. No. 3,663,671 and Patterson U.S. Pat. No. 3,676,538 among others.

The coloring agent employed is usually a color dye or pigment material that is not harmful to the skin and usually dissolved and/or dispersed in water and suitably introduced into the base soap being worked in the plodder. Preferably the coloring agent is a water soluble dye certified by the Food and Drug Administration for external cosmetic or drug use, i.e., FD&C or D&C or external D&C dyes. A water soluble coloring agent is preferable to a water insoluble dye or pigment material because the former avoids any problem of an insoluble color residue when the soap bar is being consumed and tend to be more suitable for use on the skin.

A disadvantage has been noted, however, in multicolored soap bars incorporating water soluble coloring agent in that the stripes or streaks may not be distinct or show sharp contrast with the base soap color at their edges, and this is particularly apparent at the surface of the bar. Apparently, due to the moisture content of the base soap, the colors leach into adjoining areas which results in interface bleeding between the background and colored portions and a "washed out" appearance. This bleeding effect also occurs when water insoluble pigments are used as the coloring agent, although to a lesser degree. The bleeding effect becomes increasingly more apparent as the moisture content of the soap increases, particularly over 12% moisture by weight.

The invention includes the advantageous discovery that when a coloring agent is dispersed in a liquid oil vehicle as described herein before being combined with the base soap material, the foregoing bleeding effect is minimized and the streaks or stripes in the resulting bars are sharper and more distinct, thereby creating greatly improved appearance. Moreover when the coloring agent is dispersed in an oil vehicle according to the invention the total viscosity of the dispersion is increased so that less coloring agent is required to obtain the same effect and the color variegation is more distinct.

A primary advantage of the invention is to provide a colored material comprising a dye or pigment dispersed, suspended, dissolved, or emulsified in an oil vehicle that when combined with a base soap material results in an attractive soap bar that exhibits a minimum of interface bleeding.

A further advantage of the invention is to permit the use of high moisture content base soap material, i.e., 12% or more water by weight, while maintaining the color distinctiveness required for a saleable product.

Still further, the use of oil vehicles for the coloring agent provides the bar with an improved "feel" and soothing and emollient effects to the skin.

A still further advantage of the invention is the reduction of excess free alkali in the base soap material by using an oil vehicle containing fatty acids that neutralize excess free alkali.

A still further advantage of the invention is the use of less coloring agent to obtain a desired colored effect.

Still further, the invention can reduce the loss of perfume normally used in a soap bar through evaporation by using a perfume oil as the vehicle for the coloring agent.

SUMMARY OF THE INVENTION

The invention provides an improved method for making multicolored, striated variegated or marbleized soap bars. The method of the invention includes the steps of supplying a colored material of dissolved, dispersed, emulsified or suspended coloring agent in an oil vehicle, combining the colored material with a base soap material to form a multicolored soap mass, extruding the soap mass to form a multicolored billet, cutting the multicolored billet into bars and pressing the bars to a desired final shape. The term soap as used herein includes saponified fatty acids as well as synthetic detergents and combination thereof.

The coloring agent can be any dye or pigment suitable for use in a soap bar and not harmful to human skin. Water soluble FD&C, D&C or ext. D&C dyes are particularly suitable and include ultramarine blues and pinks, cosmetic green oxides and keratin as naturally occurring in palm oil. Further suitable colored materials are those referred to in the U.S. as FD&C (food, drug and cosmetics) and D&C (drugs and cosmetics) approved dyes. Typical of coloring agents of this type are the following D&C dyes:

| Color | Color Index No. |
|---|---|
| D&C Green No. 5 | 61570 |
| D&C Green No. 6 | 61565 |
| D&C Green No. 8 | 59040 |
| D&C Yellow No. 10 | 47005 |
| D&C Red No. 6 | 15850 |
| D&C Red No. 7 | 15850 |
| D&C Red No. 8 | 15585 |
| D&C Red No. 9 | 15585 |
| D&C Red No. 10 | 15630 |
| D&C Red No. 11 | 15630 |
| D&C Red No. 12 | 15630 |
| D&C Red No. 13 | 15630 |
| D&C Red No. 19 | 45170 |
| D&C Red No. 21 | 45380A |
| D&C Red No. 22 | 45380 |
| D&C Red No. 27 | 45410 |
| D&C Red No. 28 | 45410 |
| D&C Red No. 30 | 73360 |
| D&C Red No. 33 | 17200 |
| D&C Red No. 34 | 15880 |
| D&C Red No. 36 | 12085 |
| D&C Red No. 37 | 45170B |
| D&C Orange No. 5 | 45370A |
| D&C Orange No. 10 | 45425A |
| D&C Orange No. 11 | 4542Na |
| D&C Orange No. 17 | 12075 |
| D&C Blue No. 1 | 42090 |
| D&C Blue No. 4 | 42090 |
| D&C Blue No. 6 | 73000 |

-continued

| Color | Color Index No. |
|---|---|
| D&C Blue No. 9 | 69825 |

Examples of pigments employable in the method of the invention include aluminium, barium and other metallic lakes of dyes such as those described hereinabove. Other suitable pigments are monestral green GWP, monestral blue, Calcocid yellow, chrome oxides, Ochres and titanium dioxide (white). The color of the coloring agent is chosen to contrast with the color of the base soap material and can be white when the base soap material is a color other than white.

The oil vehicle for the coloring agent can be any suitable oil, either of vegetable, animal or mineral origin that is not harmful to the human skin and will not react chemically with the coloring agent. The oil vehicle should have a viscosity in the range of about 50 cps to about 150 cps and a specific gravity in the range of 0.5 to 1.0 at temperatures from about 60° F to 100° F in order to be suitably combined with the base soap material by dripping, spraying or injection.

Suitable oil vehicles according to the invention include vegetable oils such as almond oil, babassu oil, coconut oil, corn oil, cottonseed oil, olive oil, palm-kernel oil, palm oil, peanut oil, tall oil and soybean oil. Palm-kernel oil and palm oil are particularly preferred vegetable oils since they they contain the natural coloring agent keratin and may be used without the addition of a separate coloring agent. Keratin is a natural dye having a golden yellow color that is present to different degrees in palm oil and palm kernel oil.

According to a specific aspect of the invention, essential oils which are distilled oils of vegetable origin having a pleasant fragrance, can be used as the vehicle for the coloring agent. Typically, essential oils and mixtures of essential oils, commonly known as perfumes, are added to the amalgamator upstream of the soap plodder during the manufacture of soap bars. A significant portion of the perfume oil added to the amalgamator is lost by evaporation due to exposure to the atmosphere during processing. By using perfume or essential oils as the coloring agent vehicle, the oil serves the dual function of odoriferous agent and carrier for the coloring agent and loss by evaporation is minimized since the perfume can be added in the enclosed plodder rather than upstream of the plodder. Representative essential oil are lavender, lemon oil, sandalwood oil, rose oil and peppermint oil among many others.

Representative of animal oils employable as a vehicle for the coloring agent are fish oils, fish-liver oils, greases, neat's-foot oil, whale oil and oils from other animals.

The coloring agent is dissolved, dispersed, suspended or emulsified in the oil vehicle by any suitable means known in the art such as batch mixing. When oils that naturally include coloring agent are used, the specific addition of a coloring agent is not required although may be desired to obtain a particular coloring effect. The foregoing coloring agents and oil vehicles can be used either singly or in any suitable combination as desired for particular coloring effects. The coloring agent typically comprises from at least about 1 to 50 percent by weight, preferably from about 10 to about 20 percent of the colored material depending on the colored effect desired.

The weight ratio of colored material to base soap material is 1:50 to 1:1000 preferably 1:100, to 1:200, i.e., about 1 to 0.5 percent by weight depending on the colors used and the multicolored effect desired.

DESCRIPTIONS OF SPECIFIC EXAMPLES

The invention can be further illustrated by the following examples. All percentages given in the examples and elsewhere in the specification and claims by weight unless stated otherwise.

EXAMPLE 1

| COLORED MATERIAL | BASE SOAP MATERIAL |
|---|---|
| 90% cottonseed oil | 49% olefin sulfonate detergent |
| 2% titanum dioxide | 49%, 17:83 coco:tallow sodium soap chips |
| 8% D&C yellow No. 10 | 1% perfume |

The base soap material is plodded through the upper barrel of a double barrel vacuum plodder and extruded in the form of segments, pellets or strands into the vacuum chamber between the plodder barrels. The colored material is introduced into the vacuum chamber according to the method and apparatus described in the Compa U.S. Pat. No. 3,609,828 at a temperature between 65° F and 75° F. A sufficient amount of the colored material to provide about 0.58% of colored material in the final multicolored soap product is supplied to the vacuum chamber. The colored material and base soap are plodded together in the bottom plodder barrel and extruded through a die to form a continuous billet of soap. The billet is cut into bars of desired thickness and pressed to shape. The resulting bars have a white base with yellow variegations or stripes depending on the plodder and extrusion techniques used. After storage, and in use, the bars retain a distinctive multicolored appearance with little evidence of interface bleeding.

EXAMPLE 2

| COLORED MATERIAL | BASE SOAP MATERIAL |
|---|---|
| 85% Essential oil of lemon | 100% 17:83 Coco:tallow |
| 15% Monestrel Green GWD | sodium soap chips |

The method of Example 1 is used to combine the colored material and base soap material to result in about 2.0% colored material in the final product. The final bars have a whitish base color with distinctive green variegations. Virtually no evidence of interface bleeding is found after prolonged storage.

The lemon oil vehicle for the coloring agent also provides a pleasant fragrance to the final bar and eliminates the need for addition of a perfume to the base soap material, which is customary.

EXAMPLE 3

| COLORED MATERIAL | BASE SOAP MATERIAL |
|---|---|
| 90% Essential oil of Rose | 100% Coco Monoglyceride |

| COLORED MATERIAL | BASE SOAP MATERIAL |
|---|---|
| 10% D & C Green No. 8 | Detergent |

The method of Example 1 is used to produce a multicolored detergent bar of this formulation and with the pleasant fragrance of Rose and 1.5% coloring material.

The bars exhibit distinct green regions against a light background and the absence of significant interface bleeding. No perfume need be added to the base soap other than the coloring agent vehicle to produce an acceptable product fragrance.

EXAMPLE 4

| COLORED MATERIAL | BASE SOAP MATERIAL |
|---|---|
| 80% extra light mineral oil<br>10% ultramarine blue | 99%, 17:83 Coco:tallow sodium soap chips<br>1% perfume |

The method of claim 1 is used to produce a multicolored (blue-white) bar. Sufficient coloring material to result in a final bar having 1.0% coloring material, is combined with the base soap material.

EXAMPLE 5

| COLORED MATERIAL | BASE SOAP MATERIAL |
|---|---|
| 100% palm oil | 100%, 17:83 Coco:tallow sodium soap chips |

The palm oil is naturally colored with keratin and is combined with the base soap in a weight ratio of about 1:150. The method of claim 1 is used to produce a light base color bar having golden yellow striations or variegations.

All of the bars produced by Examples 1–5 have distinct variegated areas of a different, preferably contrasting color with the base soap material.

Additionally, the base soap material can include a coloring agent to provide a colored base, such as pink, blue, yellow or green with contrasting white or colored variegated areas provided according to the invention, by the addition of colored material to the base soap material.

In further accordance with the invention, any of the methods of the prior art for producing multicolored soap bars using a liquid colored material combined with a base soap material can be used with any of the formulations of Examples 1–5 instead of the preferred method as disclosed in the aforementioned Compa et al patent.

For example, the colored materials of the invention can be sprayed on the soap chips before they are introduced into the upper barrel of a double barrel vacuum plodder, as shown and described in the Matthaei U.S. Pat. No. 3,769,225. Similarly, the colored material can be injected into the base soap mass at various points in the plodder as shown and described in the U.S. Pat. Nos. 3,832,431; 3,676,538, and 3,663,671. However, excellent results have been obtained with the method and apparatus described in the Compa et al U.S. Pat. No. 3,485,905, the disclosure of which is incorporated herein by reference, and this method is preferred.

The multicolored soap bars produced by the Examples 1–5 include a base soap material having a base color, typically light colored, and a plurality of veined areas of a color different from the base and preferably contrasting with the base color. The veined areas are randomly dispersed throughout the soap and appear on its surface as distinct stripes or variegations depending on the operating parameters of the process and apparatus used. The veined areas include the coloring agent and the oil vehicle and are stable during prolonged storage, i.e., 6 months or greater, as evidenced by a very little, if any, interface bleeding.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for producing multicolored soap bars comprising the steps of supplying to the vacuum chamber of a double barrel plodder which comprises upper and lower barrels separated by a vacuum chamber, a colored material including a liquid oil vehicle selected from oils of animal, vegetable and mineral origin and a water soluble dye, supplying a base soap material to said plodder, combining said colored material with said base soap material in the lower barrel of said double barrel plodder to form a multicolored soap mass, extruding said multicolored soap mass to form a multicolored billet, subdividing said billet into bars and pressing said bars to a desired shape.

2. The method of claim 1 wherein said colored material is dripped or sprayed into said vacuum chamber.

3. The method of claim 1 wherein said colored material has a viscosity from about 50 CPS to about 150 CPS and a specific gravity from 0.5 to 1.0 at temperatures from about 60° F. to 100° F.

4. The method of claim 1 wherein said oil vehicle is chosen from the group consisting of palm oil and palm-kernel oil.

5. The method of claim 1 wherein said colored material comprises from about 1 to about 50 percent by weight water soluble dye.

6. The method of claim 1 wherein the weight ratio of colored material to base soap material is from 1:50 to 1:1000.

* * * * *